United States Patent [19]

Hirasawatsu et al.

[11] 4,124,999
[45] Nov. 14, 1978

[54] SUPPORT ASSEMBLY FOR COUPLING OF UNIVERSAL JOINT

[75] Inventors: Tetsuo Hirasawatsu, Kashiwarashi; Takashi Matsueda, Nonichimachi, both of Japan

[73] Assignee: Koyo Seiko Company Limited, Osaka, Japan

[21] Appl. No.: 817,669

[22] Filed: Jul. 21, 1977

[51] Int. Cl.$^2$ .......................... F16D 3/76; F16D 3/26
[52] U.S. Cl. ........................ 64/17 R; 64/7; 64/8; 72/238; 72/249
[58] Field of Search .................. 72/238, 249; 64/7, 8, 64/17 R

[56] References Cited

U.S. PATENT DOCUMENTS

| | | | |
|---|---|---|---|
| 2,618,941 | 11/1952 | Iversen | 64/7 |
| 2,845,781 | 8/1968 | O'Brien | 64/8 |
| 2,911,804 | 11/1959 | O'Brien | 64/7 |
| 3,126,722 | 3/1964 | Kramer | 64/8 |
| 3,301,008 | 1/1967 | Beinke | 64/17 R |
| 3,339,379 | 9/1967 | Snyder | 64/7 |
| 3,443,400 | 5/1969 | Polhall | 64/8 |

*Primary Examiner*—Benjamin W. Wyche
*Assistant Examiner*—R. C. Turner
*Attorney, Agent, or Firm*—Mason, Fenwick & Lawrence

[57] ABSTRACT

A support assembly for coupling of a large-sized universal joint of the cardan type as incorporated in a drive assembly for rolling mills. The assembly supports the coupling on a drive spindle portion to prevent the coupling from hanging. A locking rod fixed to the center of the coupling extends through a hole of large diameter formed in the center of the spider of the universal joint, with a sufficient radial clearance provided between the rod and the inner periphery of the spider. The piston rod of a hydraulic cylinder disposed within an inner bore of the drive spindle portion operates to slidingly move a rod receiving member within the bore, thereby bringing a recess portion of the rod receiving member into engagement with or disengagement from the free end of the locking rod. The coupling is securely supported on the drive spindle portion by the engagement of the rod receiving member with the locking rod.

3 Claims, 1 Drawing Figure

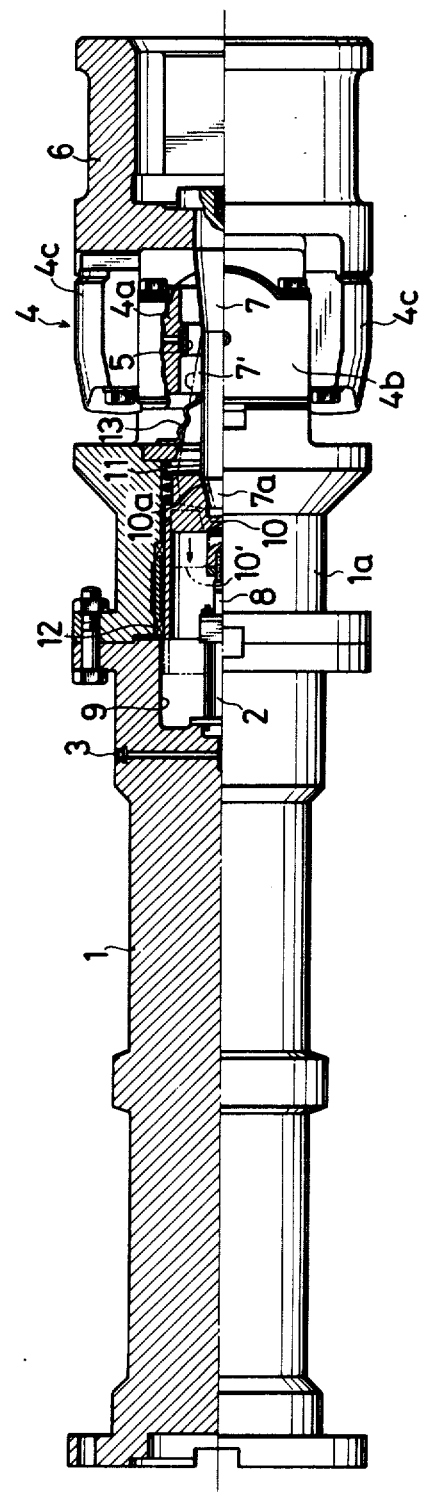

4,124,999

SUPPORT ASSEMBLY FOR COUPLING OF UNIVERSAL JOINT

BACKGROUND OF THE INVENTION

The present invention relates to a support assembly for the coupling of a universal joint, and more particularly to an assembly for supporting the coupling of universal joints for use in drive assemblies of rolling mills.

Slipper couplings or gear couplings have heretofore been used as large-sized universal joints in drive assemblies for rolling mills. To ensure improved torque transmission efficiencies, there is a tendency in recent years to use universal joints of the cardan type in rolling roll drive systems or the like.

Although cardan-type universal joints operate satisfactorily while they are connected to a drive shaft and a drive shaft with their joints in engagement therewith, a problem is encountered when the drive shaft (roll neck) is withdrawn from the coupling on the driven side, for example for the replacement of the roll. That is, even when the joint is provided with a support at its intermediate portion, namely at the rotary shaft portion, the coupling hangs down from the joint portion on the driven side. Accordingly, the neck of the new roll will not be fittable to the coupling, unless the coupling is raised into alignment with the roll.

To solve this problem, the following means are used for large-sized universal joints of the cardan type which are not liftable by the man power.

(1) Means for supporting the outer peripheral portion of the coupling against hanging before the roll neck is released from the coupling.

(2) Means provided at the yoke portion of the joint for minimizing the hanging of the coupling and thereby holding the coupling approximately in alignment with the roll when the roll neck is withdrawn. Additionally, the end of the roll neck and the inlet of the coupling are chamfered so that the roll neck can be forced into fitting engagement with the coupling, initially by being guided thereinto by the chamfers.

However, the supporting means (1) is generally of complex construction and costly and is not usable when the space available is limited, whereas the means (2) has the serious drawback that the restriction of hanging in turn restricts the function of the universal joint. Thus, the latter means has greatly limited applications.

SUMMARY OF THE INVENTION

In a drive assembly including a universal joint of the cardan type as described above, an object of this invention is to prevent the hanging of the coupling of the joint when a driven shaft or drive shaft is withdrawn from the coupling.

Another object of this invention is to provide an assembly incorporated in a universal joint for preventing its coupling from hanging without restricting the angle of flexure of the joint during its rotation but fully ensuring the function of the universal joint.

To fulfil the foregoing objects, the assembly of this invention has the following characteristics. A universal joint is formed with a hole of large diameter extending through the center of its spider, while a drive spindle portion has an inner bore opposed to the hole and accommodating a pneumatic or hydraulic cylinder. Either one of the coupling of the universal joint and the piston rod of the cylinder is provided with a locking rod extending through the hole with a sufficient radial clearance formed between the rod and the inner periphery of the spider. The other of the coupling and the piston rod is provided with a rod receiving member engageable with the free end of the locking rod. The piston rod, when advancing or retracting, brings the locking rod end and the rod receiving member into or out of engagement with each other. The coupling is securely supportable on the drive spindle portion by the engagement of the rod end with the rod receiving member.

The present assembly is incorporated for example in a rolling mill of the Mannesmann type for steel tubes to completely prevent hanging of the coupling during the replacement of roll by the engagement of the locking rod with the rod receiving member. Since there is a sufficient radial clearance between the locking rod and the inner periphery of the spider defining the hole, the locking rod which is held out of engagement with the receiving member during operation causes no trouble to the function of the universal joint. Especially because the cylinder, locking rod and rod receiving member are provided within the drive assembly, the provision of the support assembly produces no adverse effect on the outer peripheral portion of the drive assembly, permitting the universal joint to retain very high strength. Thus, the present assembly has outstanding advantages over like devices heretofore proposed.

Other objects and features of this invention will become more apparent from the following description.

BRIEF DESCRIPTION OF THE DRAWING

The drawing is a front view of an embodiment of this invention with one half shown in vertical section.

DESCRIPTION OF THE PREFERRED EMBODIMENT

With reference to the drawing, a drive assembly includes a drive spindle portion 1 having at its one end a sleeve portion 1a connected thereto and serving as a yoke of a universal joint 4 of the cardan type to provide a single spindle. The spindle end portion is formed with an inner bore 9 communicating with the interior space of the sleeve portion 1a.

The inner bore 9 accommodates a cylinder 2 to which oil pressure, air pressure or like fluid pressure is supplied from an unillustrated pressure source by way of a port 3 formed in the drive spindle portion 1. The universal joint 4 includes a spider 4a connected by needle cases 4b to the sleeve portion 1a of the drive spindle portion and formed with a hole 5 of large diameter extending through its center. The universal joint 4 includes a coupling 6 connected by needle cases 4c to a drive shaft or driven shaft. A locking rod 7 is fixed at its base end to the center of the coupling 6 and extends through the hole 5 into the inner bore 9 of the drive spindle portion 1, with a sufficient radial clearance formed between the locking rod 7 and the inner periphery of the spider 4 defining the hole 5.

The cylinder 2 is provided with a piston rod 8 movable axially of the spindle portion 1 by the hydraulic of pneumatic pressure supplied to the cylinder 2. The cylinder rod 8 is in engagement with a rod receiving member 10 slidably fitting in the inner bore 9 of the sleeve portion 1a of the spindle portion 1 and formed in its front end face with a recessed portion 10a engageable with and disengageable from the free end 7a of the locking rod 7. A spring 11, acting on the rod receiving member 10 against the hydraulic or pneumatic pressure, forces the rod receiving member 10 to a position indicated in a phantom line 10' in the drawing when the receiving member 10 is relieved of the pressure. The rod receiving member 10 may be made integral with the piston rod 8. Alternatively, the rod receiving member 10 may be secured to the coupling 6, with the locking rod 7 made integral with the piston rod 8. The drawing further shows bearings 12 for permitting the sliding movement of the rod receiving member 10 and a boot 13 for preventing the leakage of oil or the like.

When the locking rod 7 and the receiving member 10 are in the solid-line position in the drawing, the free end 7a of the rod 7 is in engagement with the recessed portion 10a of the member 10. Stated more specifically, the hydraulic or pneumatic pressure supplied from the unillustrated pressure source through the port 3 in the spindle portion 1 forces the piston rod 8 rightward in the drawing, bringing the rod receiving member 10 into engagement with the locking rod 7 in the above-mentioned position. The engagement thus effected retains the coupling 6 in alignment with the spindle portion 1 against hanging. In this state, a roll neck (not shown) serving as the driven shaft (or drive shaft) is withdrawn from the coupling 6 and the neck of a new roll is fitted therein.

When replacement of the roll or like work has been completed, the hydraulic or pneumatic pressure is released from the cylinder 2, whereupon the spring 11 forces the rod receiving member 10 and the piston rod 8 toward the position of the phantom line 10', disengaging the recessed portion 10a from the free end 7a of the locking rod 7. The pressure source is disconnected from the port 3. This renders the locking rod 7 freely tiltable within the range indicated in the phantom line 7' in the drawing. Thus the locking rod will in no way restrict the angular displacement of the coupling 6 relative to the spindle portion 1 at the joint portion during the operation of the rolling mill, enabling the universal joint to function to an utmost extent.

The free end 7a of the locking rod 7 and the recessed portion 10a of the rod receiving member 10 are tapered to guide and facilitate the engagement therebetween even when the position of the coupling involves a slight angular displacement relative to the spindle portion.

What is claimed is:

1. A support assembly for the coupling of a universal joint comprising:
    a spider having a hole of large diameter extending through its center,
    a couplng connected to the spider by needle cases and detachably fittable to a drive shaft or a driven shaft,
    a drive spindle portion connected to the spider by needle cases and formed in its connected spindle end portion with an inner bore opposed to the hole,
    a cylinder disposed within the inner bore of the drive spindle portion and operative by fluid pressure, the cylinder including a piston rod operative by the fluid pressure, and
    support means engageable and disengageable by being controlled by the movement of the piston rod to securely support the coupling on the drive spindle portion, the support means comprising a locking rod fixed to either one of the coupling and the piston rod and extending through the hole with a sufficient radial clearance formed between the rod and the inner periphery of the spider defining the hole and a rod receiving member provided on the other of the coupling and the piston rod and engageable with and disengageable from the free end of the locking rod, the coupling being securely supportable on the drive shaft portion by the engagement between the free end of the locking rod and the rod receiving member.

2. A support assembly as defined in claim 1 wherein the locking rod is secured to the center of the coupling, and the rod receiving member is slidable within the inner bore of the drive spindle portion by the movement of the piston rod, the rod receiving member having a recessed portion engageable with the free end of the locking rod.

3. A support assembly as defined in claim 1 wherein the free end of the locking rod and the recessed portion of the rod receiving member are tapered to guide the rod free end into the recessed portion of the rod receiving member.

* * * * *